(12) United States Patent
Lee

(10) Patent No.: US 8,706,401 B2
(45) Date of Patent: Apr. 22, 2014

(54) TRAVEL GUIDE AND SCHEDULE-BASED ROUTING DEVICE AND METHOD

(75) Inventor: Choy Wai Lee, Olathe, KS (US)

(73) Assignee: Garmin Switzerland GmbH (CH)

(*) Notice: Subject to any disclaimer, the term of this patent is extended or adjusted under 35 U.S.C. 154(b) by 723 days.

(21) Appl. No.: 12/896,561

(22) Filed: Oct. 1, 2010

(65) Prior Publication Data

US 2011/0022304 A1    Jan. 27, 2011

Related U.S. Application Data

(63) Continuation of application No. 11/470,179, filed on Sep. 5, 2006, now Pat. No. 7,822,546.

(51) Int. Cl.
*G08G 1/123* (2006.01)

(52) U.S. Cl.
USPC ...................................... 701/410; 340/995.14

(58) Field of Classification Search
USPC ......... 701/400, 408–410, 421, 426, 438, 454, 701/457; 340/995.14–995.19, 995.25, 340/995.27, 995.28, 995.2
See application file for complete search history.

(56) References Cited

U.S. PATENT DOCUMENTS

| | | | |
|---|---|---|---|
| 5,546,092 A | 8/1996 | Kurokawa et al. | 342/357 |
| 6,144,917 A | 11/2000 | Walters et al. | 701/204 |
| 6,208,934 B1 | 3/2001 | Bechtolsheim et al. | 701/209 |
| 6,418,374 B2* | 7/2002 | Sakamoto et al. | 701/410 |
| 6,654,682 B2* | 11/2003 | Kane et al. | 701/410 |
| 6,658,272 B1 | 12/2003 | Lenchik et al. | 455/575 |
| 6,662,107 B2 | 12/2003 | Gronemeyer | 1/213 |
| 6,675,089 B2* | 1/2004 | Hirabayashi et al. | 701/431 |
| 6,868,320 B1 | 3/2005 | Burch | 701/35 |
| 2003/0182052 A1* | 9/2003 | DeLorme et al. | 701/201 |
| 2006/0004514 A1 | 1/2006 | Bennett et al. | 701/208 |
| 2007/0156334 A1 | 7/2007 | Vu | 701/209 |
| 2007/0239348 A1 | 10/2007 | Cheung | 701/200 |
| 2008/0059061 A1 | 3/2008 | Lee | 701/209 |

OTHER PUBLICATIONS

U.S. Appl. No. 11/696,478, filed Apr. 4, 2007.
U.S. Appl. No. 12/019,291, filed Jan. 24, 2008.
Verizon Wireless, VZ Navigator—Answers to FAQs, 11 pages, published prior to Jan. 24, 2008.
Wikipedia, iPhone, 17 pages, published Jan. 23, 2008.

* cited by examiner

*Primary Examiner* — Dalena Tran
(74) *Attorney, Agent, or Firm* — Samuel M. Korte; Mohammad M. Ali

(57) ABSTRACT

A navigational aid device is provided that includes a GPS module, a processor, and memory. The device is configured to automatically determine a route to a destination and to account for, in its determination of a route, a plurality of modes of public, private, or both public and private transportation. Some of these configurations may also be configured to recommend a mode or modes of transportation to take to get to a destination, and/or accept user preferences in recommending a route or the mode or modes of transportation to take to get to the destination.

22 Claims, 10 Drawing Sheets

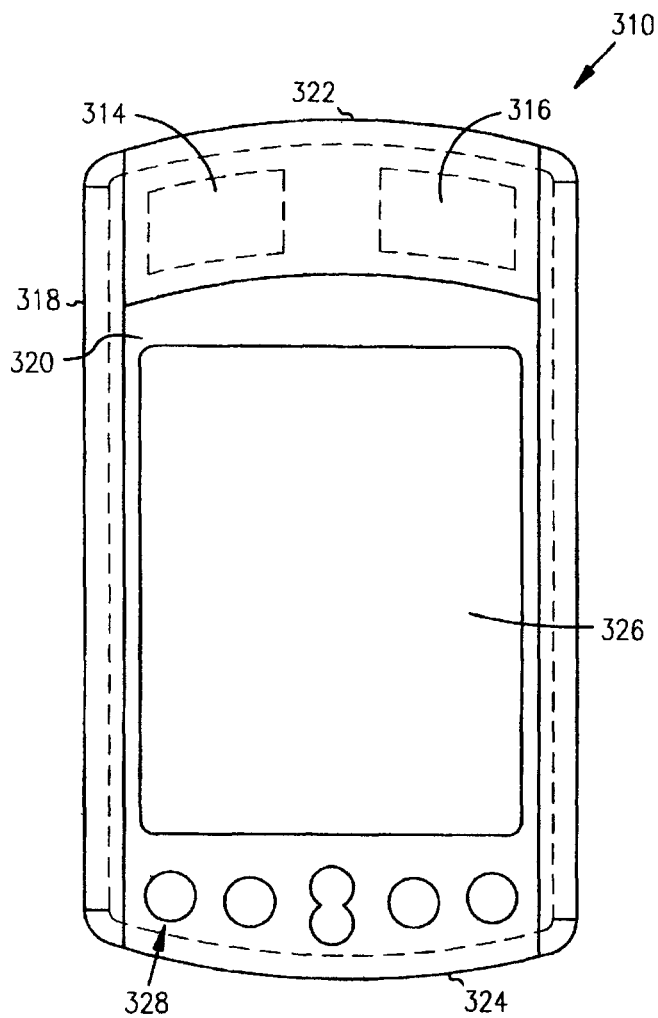
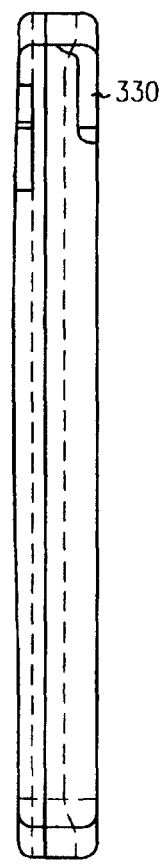
FIG. 3A  FIG. 3B
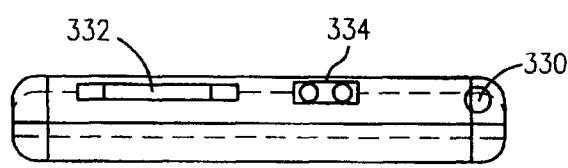
FIG. 3C

TRAVEL GUIDE AND SCHEDULE-BASED ROUTING DEVICE AND METHOD

RELATED APPLICATION

The present application is continuation of, and claims priority benefit to, commonly assigned U.S. patent application entitled "TRAVEL GUIDE AND SCHEDULE-BASED ROUTING DEVICE AND METHOD", Ser. No. 11/470,179 filed Sep. 5, 2006. The above-identified application is incorporated herein by reference in its entirety.

BACKGROUND

This invention relates generally to navigational devices, and in particular to navigational devices with improved route calculation capabilities.

Route planning devices are well known in the field of navigational instruments. However, known methods of route planning in navigational instruments do not take into account the various modes of transportation available to get a user from his or her starting point to his intended destination.

SUMMARY

In one aspect, some configurations of the present invention therefore provide a navigational aid device that includes a GPS module, a processor, and memory. The device is configured to automatically determine a route to a destination and to account for, in its determination of a route, a plurality of modes of public, private, or both public and private transportation. Some of these configurations may also be configured to recommend a mode or modes of transportation to take in order to get to a destination, and/or accept user preferences in recommending a route or the mode or modes of transportation to take in order to get to the destination.

In another aspect, some configurations of the present invention provide a method for providing routing to a destination. The method includes accepting a destination as input to a navigational aid device having a GPS module, a processor, and memory, determining available stations and entry points, including stations and entry points of public transportation modes, private transportation modes, or both, to the destination, and calculating at least one eligible route to the destination, including consideration of available modes of public transportation, private transportation, or both.

In yet another aspect, some configurations of the present invention provide a machine-readable memory (for example, a CD ROM, a floppy disk, a flash memory card, or any other temporary or permanent storage device) having stored thereon instructions configured to instruct a navigational aid device having a GPS module, a processor, and memory to accept a destination as input, determine available stations and entry points, including stations and entry points of public transportation modes, private transportation modes, or both, to the destination, and calculate at least one eligible route to the destination, including consideration of available modes of public transportation, private transportation, or both.

It will be appreciated that some configurations of the present invention provide the ability to take the availability of various different forms of transportation into account in determining and/or updating a route.

BRIEF DESCRIPTION OF THE DRAWINGS

FIGS. 3A-3C illustrate views of another electronic navigational device that may embody the present invention.

Figure 1:
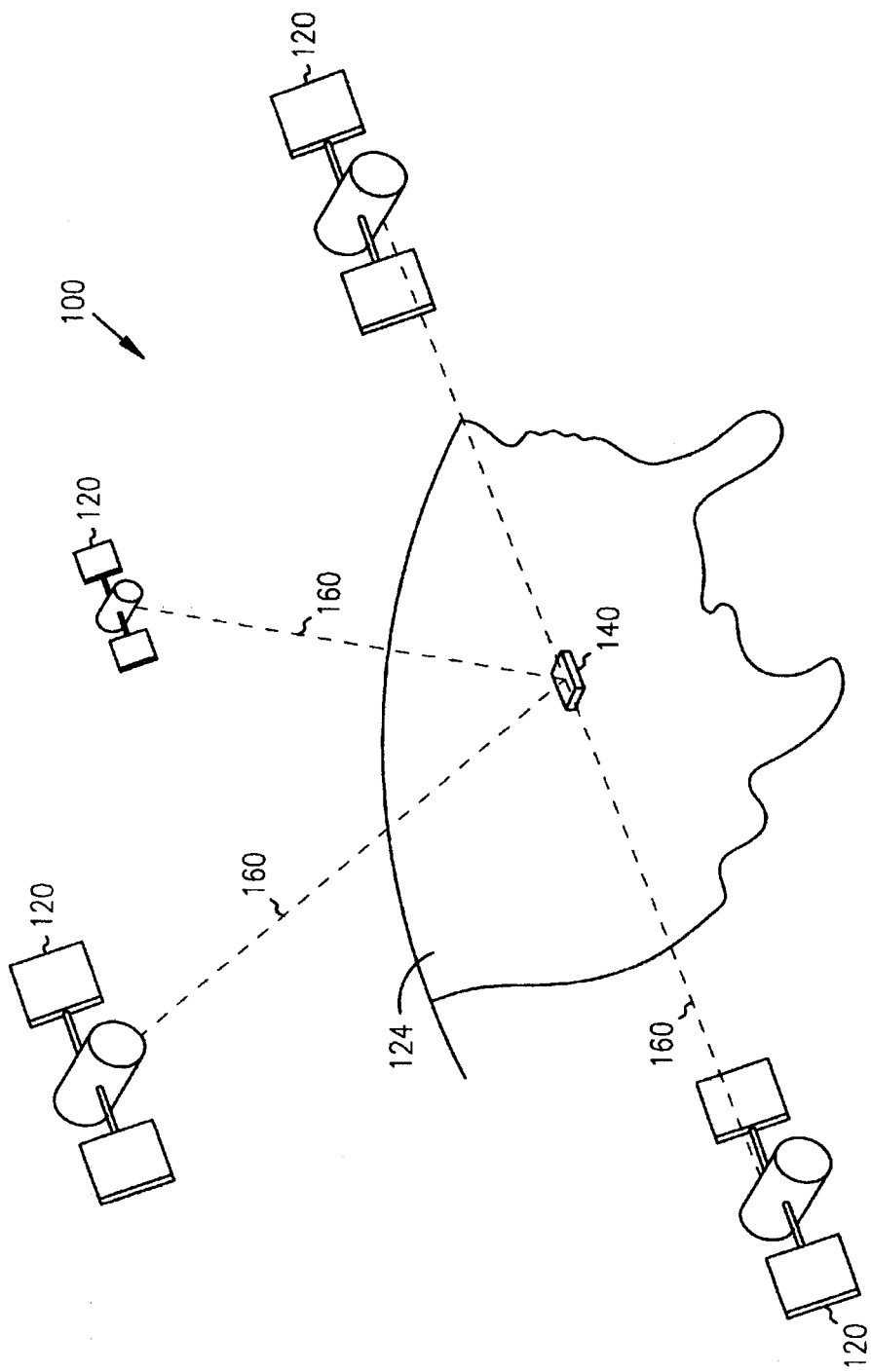
FIG. 1 is a representative view of a Global Positioning System (GPS).

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor, a block or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION

As used herein, an element or step recited in the singular and proceeded with the word "a" or "an" should be understood as not excluding plural elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following detailed description of the invention, reference is made to the accompanying drawings which form a part hereof, and in which is shown, by way of illustration, specific embodiments in which the invention may be practiced. The embodiments are intended to describe aspects of the invention in sufficient detail to enable those skilled in the art to practice the invention. Other embodiments may be utilized and changes may be made without departing from the scope of the present invention. The following detailed description is, therefore, not to be taken in a limiting sense, and the scope of the present invention is defined only by the appended claims, along with the full scope of equivalents to which such claims are entitled.

The present invention is drawn to navigational systems and devices having route calculation capabilities. One type of navigational system includes Global Positioning Systems (GPS). In general, GPS is a satellite-based radio navigation system capable of determining continuous position, velocity, time, and in some instances direction information for an unlimited number of users. Formally known as NAVSTAR, the GPS incorporates a plurality of satellites which orbit the earth in extremely precise orbits.

The GPS system is implemented when a device specially equipped to receive GPS data begins scanning radio frequencies for GPS satellite signals. The device will continue scanning for signals until it has acquired at least three different satellite signals. Implementing geometric triangulation, the receiver determines its own two-dimensional position. Additionally, acquiring a fourth satellite signal will allow the receiving device to calculate its three-dimensional position by the same geometrical calculation. Positioning and velocity data can be updated in real time on a continuous basis by an unlimited number of users.

FIG. 1 is representative of a GPS denoted generally by reference numeral 100. A plurality of satellites 120 are in orbit about the Earth 124. The orbit of each satellite 120 is not necessarily synchronous with the orbits of other satellites 120 and, in fact, is likely asynchronous. A GPS receiver device 140 in one configuration of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
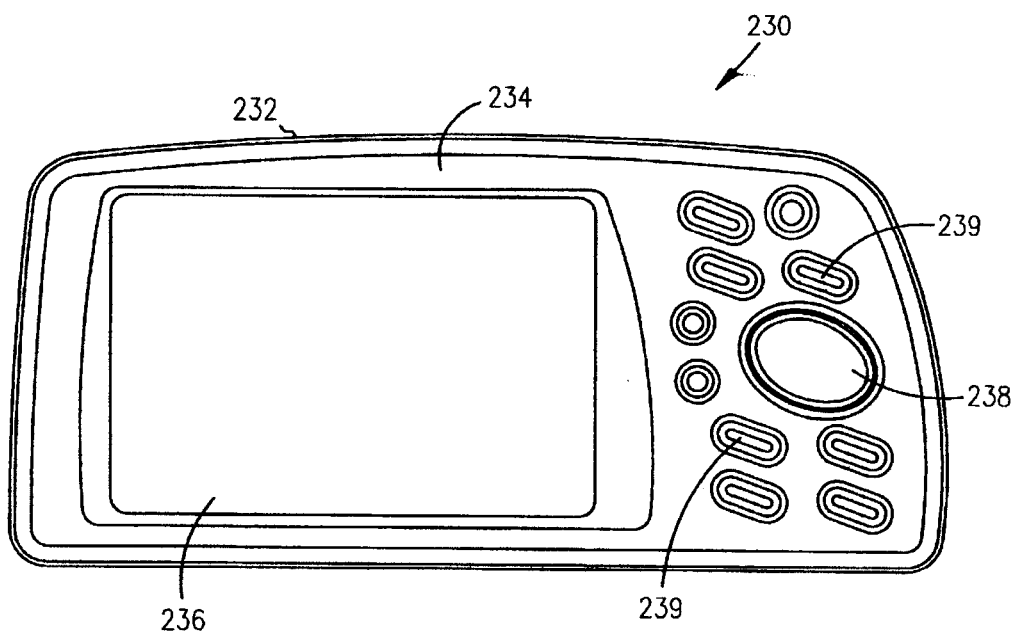
FIGS. 2A and 2B illustrate views of an electronic navigational device that may embody the present invention.
Figure 2B:
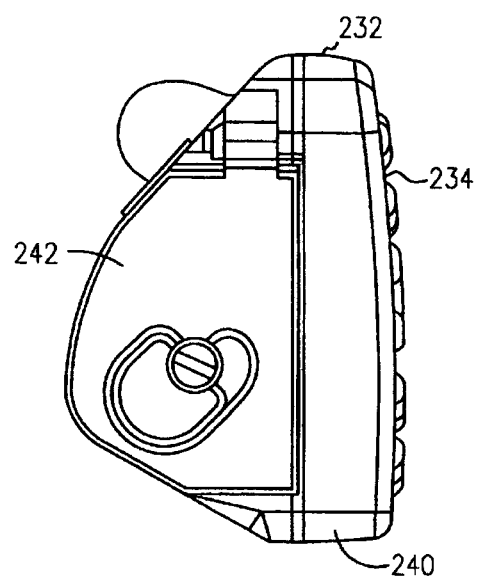

FIGS. 2A and 2B illustrate views of an electronic navigational device 230. The device 230 can be portable and can be utilized in any number of implementations such as automobile, marine, and avionic navigation, or carried by hand. In the embodiment of FIG. 2A, a front view of the navigational device 230 is provided showing the navigational device with a generally rectangular housing 232. The housing 232 is constructed of resilient material and has been rounded for aesthetic and ergonomic purposes. As shown in FIG. 2A, a control face 234 has access slots for an input key pad 238, other individual keys 239, and a display screen 236. In one embodiment, the display screen 236 is a LCD display that is capable of displaying both text and graphical information. The invention, however, is not so limited. Audio information can likewise be provided.

In FIG. 2B, a side view of the navigational device 230 is provided. FIG. 2B illustrates that the housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of one molded piece to form the housing 232 and support input key pad 238, other individual keys 239, and display screen 236 in respective access slots shown in the control face 234 of FIG. 2A.

FIGS. 3A-3C illustrate views of another electronic navigational device 310. The device 310 shown in FIGS. 3A-3C includes a personal digital assistant (PDA) with integrated GPS receiver and cellular transceiver. The GPS integrated PDA operates with an operating system (OS) such as, for example, the Palm or Pocket PC operating systems, or the Linux OS. As shown in the top view of FIG. 3A, the device 310 preferably includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A-3C illustrate the stylus 330 nested within the housing 318 for storage and convenient access in a conventional manner. The embodiment shown in FIG. 3A illustrates a number of control buttons, or input keys 328 positioned toward the bottom end 324. The invention, however, is not so limited and one will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one will appreciate that a map data cartridge bay slot 332 and headphone jack 334 can be provided at the bottom end 324, separately at opposite ends, or at any other suitable location.

It should be understood that the structure of the device 310 is shown as illustrative of one type of GPS integrated PDA navigation device. Other physical structures, such as a cellular telephone and a vehicle-mounted unit, are contemplated to be within the scope of this invention.

FIGS. 2A-2B and 3A-3C are provided as illustrative examples of hardware components for configurations of a navigational device. However, the invention is not limited to the configuration shown in FIGS. 2A-2B and 3A-3C. One will appreciate other suitable designs for a hardware device which can accommodate features of the present invention.

Figure 4A:
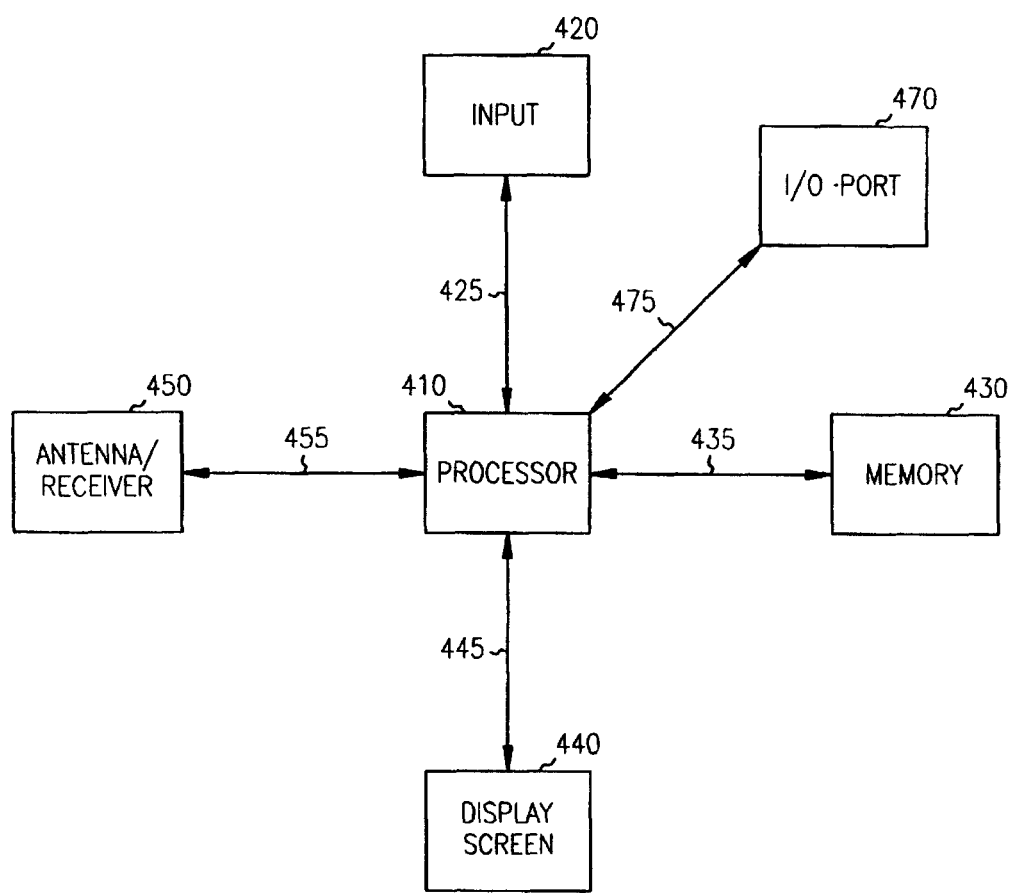
FIG. 4A is a block diagram of electronic components within the device of FIGS. 2A-3C.

FIG. 4A is a block diagram of one embodiment of electronic components within the device 230,310 of FIGS. 2A-2B and/or FIGS. 3A-3C. In the embodiment shown in FIG. 4A, the electronic components include a processor 410 which is connected to an input 420, such as keypad via line 425. It will be understood that the input 420 may include a microphone for receiving voice commands. The processor 410 communicates with a memory 430 via line 435. The processor 410 also communicates with a display screen 440 via line 445. An antenna/receiver 450, such as a GPS antenna/receiver is connected to the processor 410 via line 455. It will be understood that the antenna/receiver 450 are combined schematically for illustration, but that the antenna/receiver may be separately located components. Additionally, the antenna may be external to the housing 232,318 while the receiver remains internal. In any case, the antenna may be a GPS patch antenna or a helical antenna. The electronic components further include I/O ports 470 connected to processor 410 via line 475.

Figure 4B:
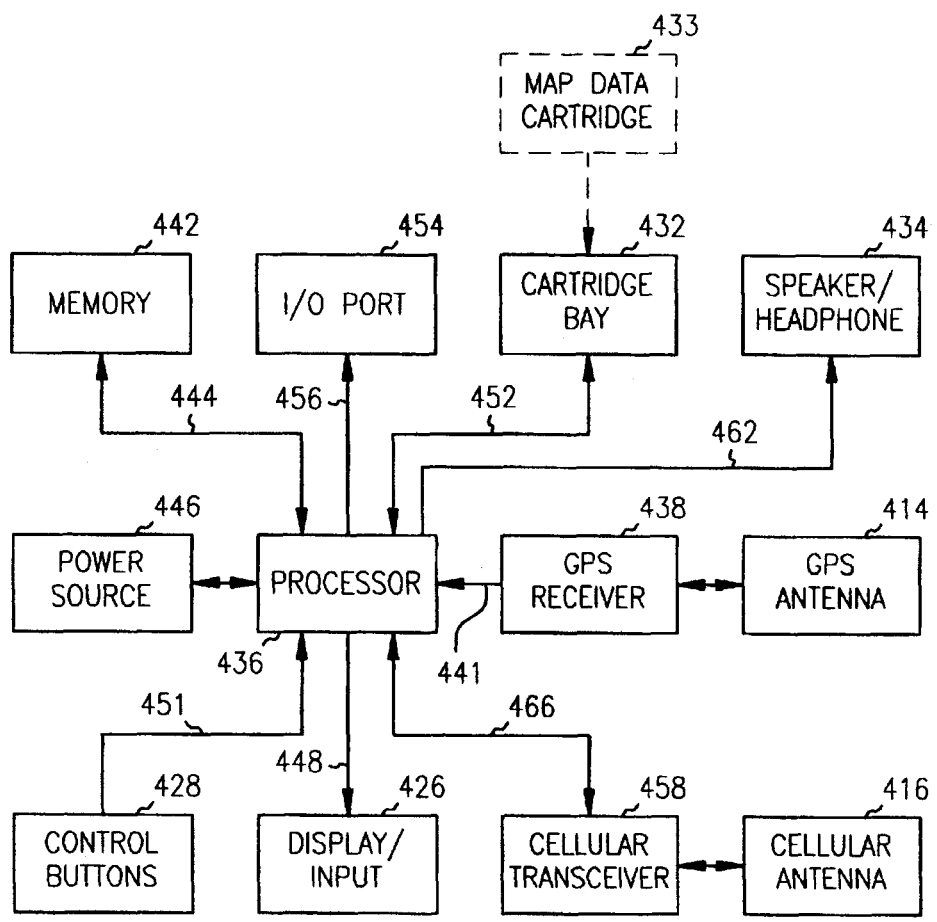
FIG. 4B is another block diagram of electronic components within the device of FIGS. 2A-3C.

FIG. 4B is a block diagram of another embodiment of the electronic components within the device 230,310 of FIGS. 2A-2B or FIGS. 3A-3C. The electronic components shown in FIG. 4B include a processor 436 which is connected to a GPS antenna 414 through a GPS receiver 438 via line 441. The processor 436 interacts with an operating system (such as PalmOS or Pocket PC) that runs selected software depending on the intended use of the device 310. The processor 436 is coupled with a memory 442 via line 444, and a power source 446 for powering the electronic components of the device 310. The processor 436 communicates with touch sensitive display screen 426 via data line 448.

The electronic components further include two other input sources that are connected to the processor 436. Control buttons 428 are connected to the processor 436 via line 451 and a map data cartridge 433 inserted into a cartridge bay 432 is connected via line 452. A conventional serial I/O port 454 is connected to the processor 436 via line 456. A cellular antenna 416 is connected to a cellular transceiver 458, which is connected to the processor 436 via line 466. The processor 436 is connected to a speaker/headphone jack 434 via line 462. The device 310 may also include an infrared port (not shown) coupled to the processor 436 that may be used to beam information from one PDA to another.

The electronic components shown in FIGS. 4A and 4B are powered by a power source in a conventional manner. One will also appreciate that different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

Using the processing algorithms of the present invention, the device selects an appropriate starting point for performing a new route calculation and the device recognizes when the device has deviated from the route stored in memory. The device then uses those electronic components to calculate a new route to navigate to the desired destination. In at least one configuration of the present invention, the device adjusts a starting point for the new route calculation to a location forward along a current thoroughfare on which the device is located or traveling such that the location is at or forward of the device at a time when the new route calculation is completed. In other words, the device adjusts a starting point for the new route calculation to a location forward along a current thoroughfare on which the device is located or traveling such that the device is on the route at a time when the new route calculation is completed. The device incorporates these and other functions as will be explained in more detail below in connection with FIGS. 6 and 7.

Figure 5:
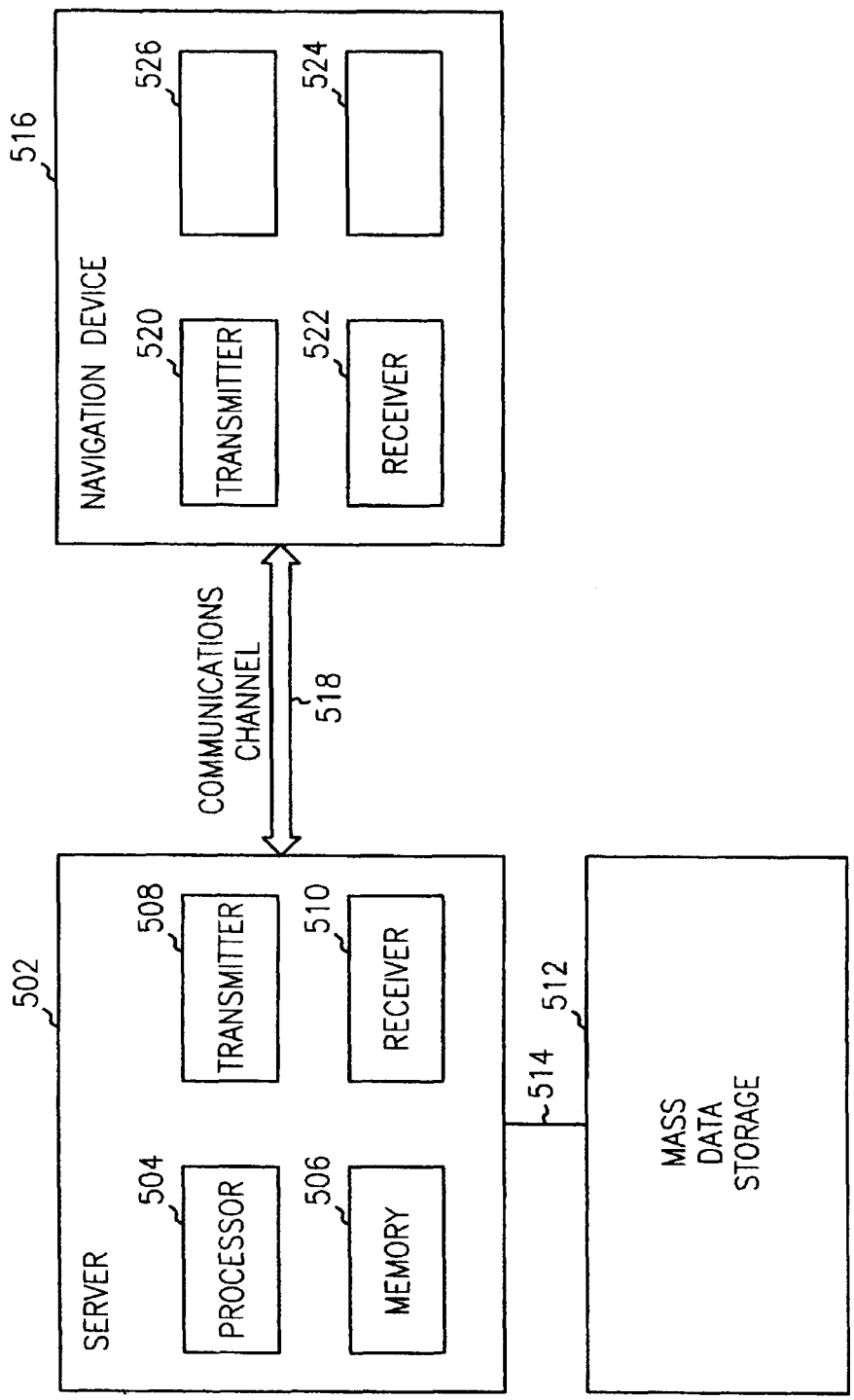
FIG. 5 is a block diagram of a navigation system.

FIG. 5 is a block diagram of an embodiment of a navigation system. The navigation system includes a server 502. According to one embodiment, the server 502 includes a processor 504 operably coupled to a memory 506, and further includes a transmitter 508 and a receiver 510 to send and receive data, communication, and/or other propagated signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. Mass data storage 512 can be a separate device from the server 502, or can be incorporated into the server 502. Mass data storage 512 may, in some configurations, include information about bus routes, train routes, airline routes, etc., that can be downloaded into a navigational aid device configuration.

In one embodiment of the present invention, the navigation system further includes a navigation device 516 adapted to communicate with the server 502 through a communication channel 518. According to one embodiment, the navigation device 516 includes a processor and memory, as previously shown and described with respect to the block diagram of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency, infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory, such as now known or hereinafter developed.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

The navigational system of FIG. 5 is adapted to remotely provide the device 516 with route calculation capabilities. In this embodiment, the processor 504 in the server 502 is used to handle the bulk of the system's processing needs. The mass storage device 512 connected to the server 502 can include significantly more cartographic and route data than that which can be maintained on the device 516 itself. In this embodiment, the server 502 processes the majority of the device's 516 travel along the route using a set of processing algorithms and the cartographic and route data stored in the mass data storage 512 and can operate on signals, e.g., GPS signals, originally received by the device 516. Similar to the device 230,310 of FIGS. 4A and 4B, the device 516 is outfitted with a display 524 and GPS capabilities 526.

As described and explained in detail in connection with FIGS. 4A and 4B, the navigation system of FIG. 5 uses processing algorithms select an appropriate starting point for performing a new route calculation. Also, the system uses the processing algorithms to recognize when the device has deviated from the route and to perform a new route calculation. The system then uses the electronic components shown in FIG. 5 to select the appropriate starting point and calculate a new route for navigating the device 516 to the desired destination. A user of the device 516 can be proximate to or accompanying the device 516. The invention however, is not so limited.

In some configurations of the present invention, the system adjusts a starting point for the new route calculation to a location forward along a current thoroughfare on which the device 516 is located or traveling such that the location is at or forward of the device 516 at a time when the new route calculation is completed. In other words, the system adjusts a starting point for the new route calculation to a location forward along a current thoroughfare on which the device 516 is located or traveling such that the device 516 is on the route at a time when the new route calculation is completed. The device 516 of the present invention includes a portable electronic navigational aid device. In one embodiment, the portable electronic navigational aid device includes a personal digital assistant (PDA). In another embodiment, the portable electronic navigational aid device includes a wireless communications device.

Alternatively, the server 502 and the mass data storage 512 may act as a remote data repository for the device 516. For example, the device 516 may determine where it is and receive indication of a destination from the user. Then, the device 516 may request and receive map data from the server 502. In this manner, the device 516 may calculate the route itself, without having to store large maps unrelated to the route.

The features and functionality explained and described in detail above in connection with the device of FIGS. 4A and 4B are likewise available in the system 500 of FIG. 5. That is, in one embodiment the navigation device 516 further provides audio and visual cues to aid the navigation along the route.

Figure 6:
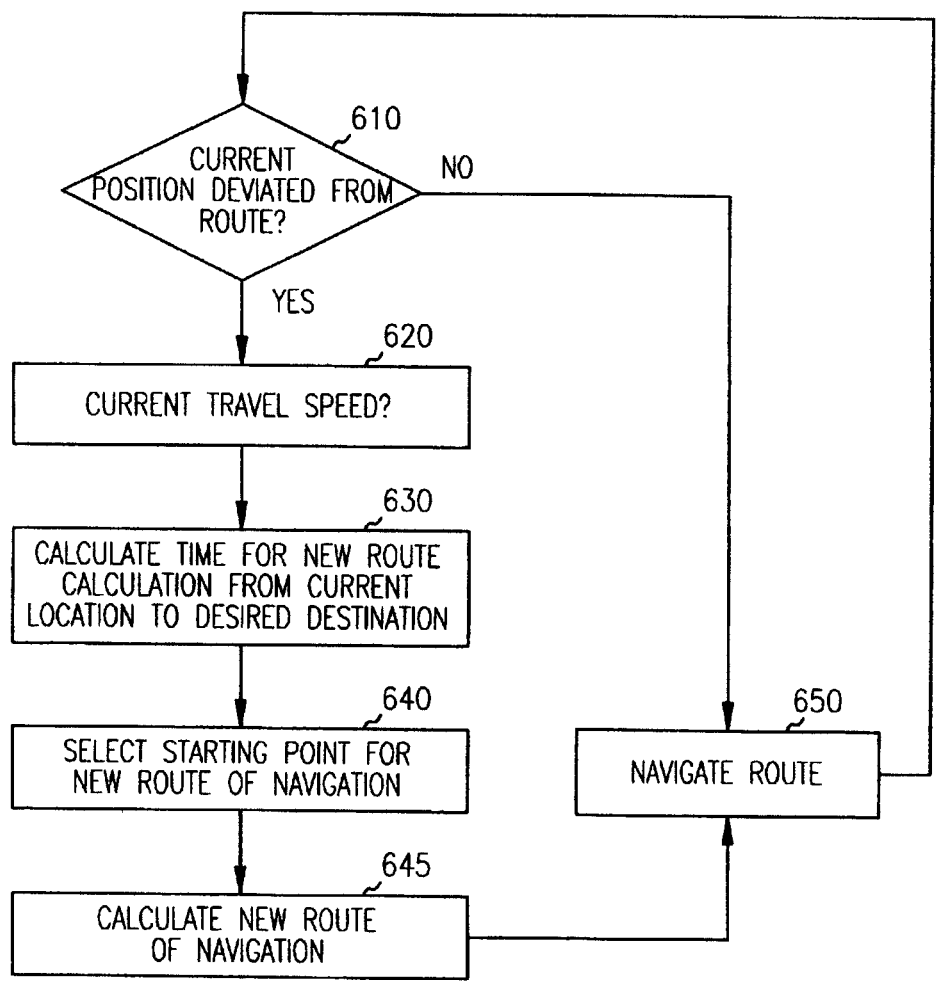
FIG. 6 is a flow diagram of the present invention.

FIG. 6 is a flow diagram of one embodiment of a navigation aid method. The navigation aid method includes a method for performing a route calculation within a navigation device or navigation system as described and explained in detail above in connection with FIGS. 4A, 4B, and 5. And, as described above, a processor is used for processing signals which include input data from input devices, e.g. keypads, other input keys, or other inputs, GPS signals from GPS components, and data received from I/O ports in order to perform the methods described herein. In the embodiment shown in FIG. 6, the navigation aid method for performing a route calculation includes detecting when a navigation device has deviated from a first route and calculating the device's current location in block 610. The device's travel speed is calculated in block 620. A calculation time is determined for processing a second route from the device's current location to a desired destination in block 630. In one embodiment, the calculation time for processing the second route is estimated based on a distance from the device's current location to the desired destination. In another embodiment, the calculation time is estimated base on a complexity of the thoroughfares from the device's current location to the desired destination. In still another embodiment, the calculation time for processing the second route is determined as a time equal to or greater than an actual previous calculation time. Of course, the calculation time may be estimated from a combination of the above methods.

Subsequently, in block 640, a starting point for the second route is selected based on the device's travel speed and the determined calculation time for processing the second route. Once the second route has been determined in block 645, the method proceeds to block 650 and navigates the route. The method embodiment described in FIG. 6 is repeatable, returning to block 610 in order to continually assess whether a then current position of the navigation device has deviated from the route. In one embodiment of the present invention, detecting when the device has deviated from the first route and calculating the device's current location includes using a global positioning system. In some configurations of the present invention, selecting a starting point for the second route includes selecting a starting point forward on a current thoroughfare on which the device is located or traveling such that the device is on the route at a time when the new route calculation is completed. In one embodiment, selecting a starting point for the second route can include a starting point located at an end of a current thoroughfare on which the device is traveling.

In one method embodiment of the present invention, the device operates on data indicative of a set of travel habits of the device on each of the plurality of types of thoroughfares and stores the travel habit data in the memory. In one embodiment of the present invention, the travel habit data includes data relating to the thoroughfare classification, the speed classification of the thoroughfare, the time of day, and the historical travel speed of the device on the particular thoroughfare. In the invention, the device regularly calculates the device's current position. The display continuously displays the device's position and uses audio and/or visual instructions to navigate to the starting point of the new route calculation as well as to navigate along the new route.

In some configurations of the present invention, and as used herein, the device's travel speed includes a learned travel speed, an estimated travel speed, and/or a current travel speed. As used herein, a learned travel speed includes travel speed data that is obtained from the data indicative of a set of travel habits of the device on each of the plurality of types of thoroughfares. As used herein, an estimated travel speed includes travel speed data that is obtained from data indicative of a thoroughfare's classification type such as an interstate, city street, residential road and the like, and includes travel speed data that is obtained from the data indicative of a thoroughfare's speed classification such as a 25 mph, 55 mph, 75 mph or other roadway speed class on each of the plurality of types of thoroughfares. In one embodiment of the present invention, calculating the device's travel speed includes using a travel speed which is the greater of the device's current travel speed and the device's learned travel speed or estimated travel speed.

If the device is not determined to be on the new route after an actual first route calculation time then the device uses a second route calculation time and the device's travel velocity to set a new starting point for another new route calculation. In one embodiment, the second route calculation time is equal to or greater than an actual first route calculation time.

In one embodiment of the present invention, the starting point is set at the end of the current thoroughfare on which the device is traveling. However, as will be understood by one of ordinary skill in the art upon reading this disclosure, there will be instances for which setting the starting point at the end of the current thoroughfare will not adequately set the starting point at a location forward of the device based on the device's travel speed and the necessary route calculation time. In those instances, the device of the present invention uses a set of criteria to analyze adjacency information and determine a straightest path in order to adjust the starting point for the new route calculation to, or sufficiently forward of, a location at which the device is likely to be at the end of the route calculation time, such that the device in on the route at a time when the new route calculation is completed. As used herein, the term adjacency information, or adjacencies, is intended to include any thoroughfare which intersects the current thoroughfare on which the device is traveling. Every place two thoroughfares intersect is termed a node. Thus, every node on a given thoroughfare connects that thoroughfare to an adjacency, or adjacent thoroughfare.

While the discussion of FIG. 6 contemplates calculating a new route when the device has deviated, such as by taking a detour, many of the steps may be used in other situations. For example, many of the steps of FIG. 6 may be used to calculate a detour route, before the device deviates. Furthermore, many of the steps of FIG. 6 may be used to calculate an initial route.

Figure 7:
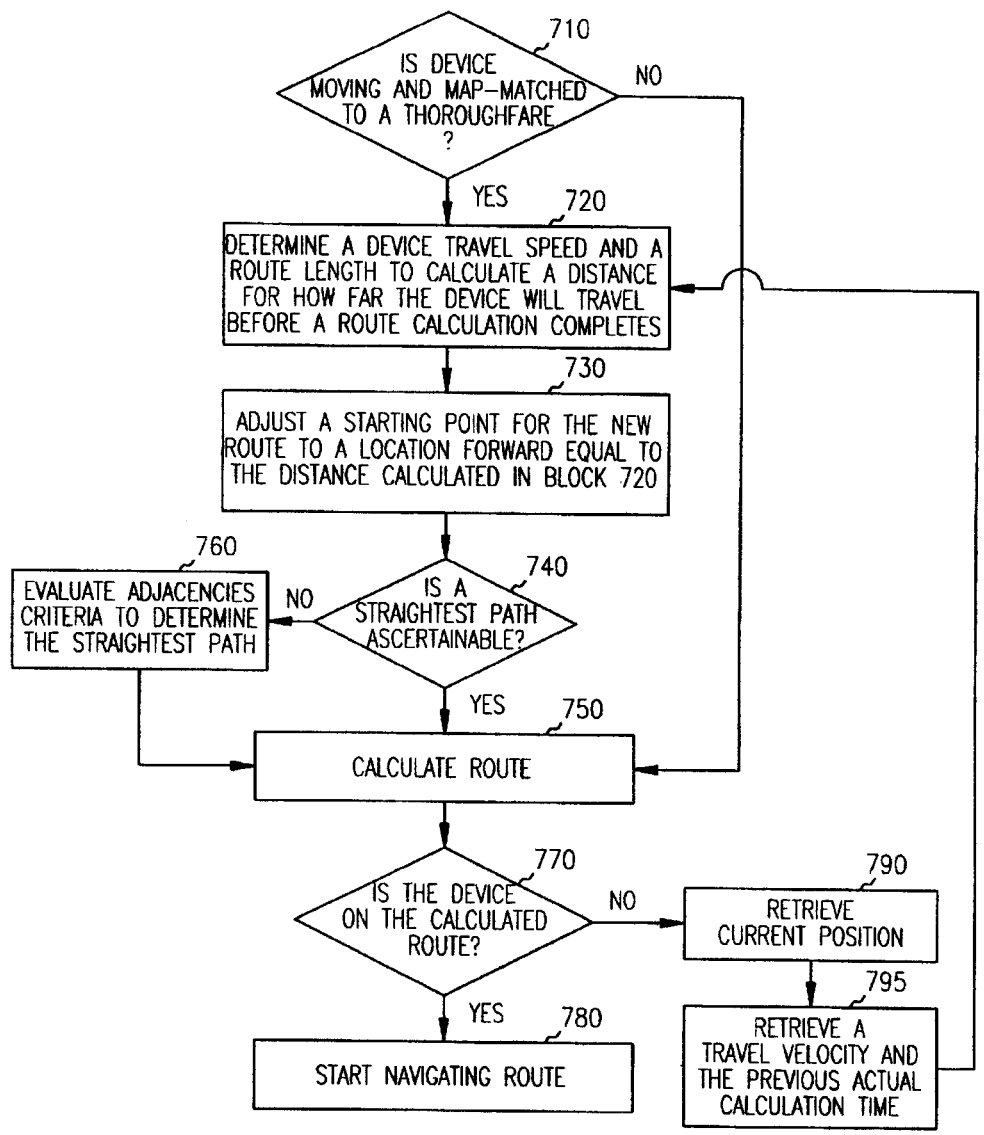
FIG. 7 is another flow diagram of the present invention.

FIG. 7 is a flow diagram of another embodiment of a navigation aid method. The navigation aid method includes a method for performing a route calculation within a navigation device or navigation system such as described and explained in detail above in connection with FIGS. 4A, 4B, and 5. And, as described above, a processor is used for processing signals which include input data from user input devices, e.g. keypads or other inputs, GPS signals from GPS device/system components, and data received from I/O ports in order to perform the methods described herein.

As shown in FIG. 7, the navigation aid method for performing a route calculation includes determining whether the navigation device is moving and map-matched to one of a plurality of thoroughfares in block 710. In one embodiment as used herein, map-matched is intended to imply determining whether the device is located on a thoroughfare, and finding and indicating the location on the mapped thoroughfare that is closest to the unmatched location indicated by raw location date determined by the GPS. In one embodiment, determining whether the navigation device is moving and map-matched to one of a plurality of thoroughfares includes using a GPS. According to the method, if the device is not map-matched to a thoroughfare then the method determines the thoroughfare on which the device is most likely to be located. As one of ordinary skill in the art will understand upon reading this disclosure, the method includes retrieving a current position of the navigation device, cartographic data for a plurality of thoroughfares in a network, and data for a desired destination.

If the device is not moving, then once the current position of the navigation device is determined the method proceeds to block 750 and proceeds to calculate a route using a current position of the navigational device as a starting point for the route calculation.

On the other hand, if the navigation device is moving, the method proceeds to block 720 where the method determines a travel speed or velocity of the navigation device and determines a route calculation time for providing a route from the current geographic position of the navigation device to a desired destination. In one embodiment, the method estimates a route calculation time for providing a route from the current geographic position of the navigation device to a desired destination. The method in block 720 for determining a travel speed or velocity of the navigation device and determining a route calculation time includes that which has been described above in connection with FIG. 6. The method in block 720 includes using this information to calculate a distance predicting how far the navigation device will travel, along a thoroughfare on which the navigation device is moving, within the determined route calculation time such that the device is on the route at a time when the new route calculation is completed.

In block 730, the method adjusts a starting point for the new route calculation to a location forward along a current thoroughfare on which the device is traveling. In one embodiment of the present invention, the method adjusts the starting point for the new route calculation forward along the current thoroughfare on which the device is traveling a distance equal to the distance calculated in block 720. In one embodiment, the method adjusts the starting point for the new route calculation forward along to the end of the current thoroughfare on which the device is traveling.

In block 740 the method includes determining whether a straightest path along the current thoroughfare on which the device is traveling is ascertainable in order to adjust the location of the starting point forward of the device. The current thoroughfare on which the device is traveling can be approaching a node or intersection of streets such that there are a number of adjacencies approaching in the direction of travel. If a straightest path along the current thoroughfare on which the device is traveling is ascertainable, then the method proceeds to block 750 and calculates a new route using a starting point location which will be at or forward of the device at a time when the new route calculation completes.

However, in some instances where the device is approaching a node or intersection of streets, such that there are a number of adjacencies approaching in the direction of travel, a straightest path along the current thoroughfare on which the device is traveling is not immediately ascertainable. Therefore, simply adjusting the starting point for the new route calculation forward, even to the end of the current thoroughfare, will not suffice or does not provide an adequate distance, based on the travel speed of navigation device and the determined new route calculation time, such that the location of the starting point will be at or forward of the device at the time the new route calculation completes.

When the straightest path is not immediately ascertainable, the method proceeds to block 760 where the method evaluates a set of adjacency criteria to determine a straightest path and locate the starting point for the new route calculation somewhere along a chosen adjacency such that the starting point for the new route calculation will be at or forward of the device at a time when the new route calculation completes. In at least one embodiment of the present invention, the set of adjacency criteria includes, but is not limited to, the degree of turn angles between the thoroughfare on which the device is located and adjacent thoroughfares connected thereto by a node, thoroughfare names, thoroughfare classifications, speed classification of the thoroughfares, and other criteria of the like. Once the straightest path along the current thoroughfare on which the device is traveling is ascertainable, then the method proceeds to block 750 where the method calculates the new route such that the device will be on the route at a time when the new route calculation is completed.

As shown in FIG. 7, once a new route has been calculated in block 750, the method proceeds to block 770. In block 770 the method determines whether the device location is on the calculated route. If so, the method proceeds to block 780 and begins navigating the new route, including navigating the device to the starting point for the new route. In one embodiment, the method navigates the new route using both visual and audio cues.

Alternatively, according to the teachings of the present invention, if the device location is not on the calculated route then the method proceeds to block 790 and retrieves the current position of the navigation device. Next, in block 795, the method retrieves a travel velocity for the device and additionally retrieves an actual calculation time which was required to perform the previous new route calculation.

In some configurations of the present invention, the method then returns from block 795 to block 720 and repeats the sequence described above until a new route calculation has been completed with a starting point for the new route such that the device is on the new route at the time the new route calculation completes and eventually proceeds to block 780 to start navigating the route.

In some embodiments, the methods provided above are implemented as a computer data signal embodied in a carrier wave or propagated signal, that represents a sequence of instructions which, when executed by a processor, such as processor 410 in FIGS. 4A and 4B or processor 504 in FIG. 5, cause the processor to perform the respective method. In other embodiments, methods provided above are implemented as a set of instructions contained on a computer accessible medium, such as memory 430 in FIGS. 4A and 4B or mass data storage device 512 in FIG. 5, capable of directing a processor, such as processor 410 in FIGS. 4A and 4B or processor 504 in FIG. 5, to perform the respective method.

The electronic components of the devices shown in FIGS. 4A and 4B and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. Various programming languages may be employed to create a software program designed to implement and perform the methods of the present invention. The programs can be structured in an object-orientation using an object-oriented language such as Java, Smalltalk or C++, or the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, the present invention is not limited to a particular programming language or environment.

Figure 8A:
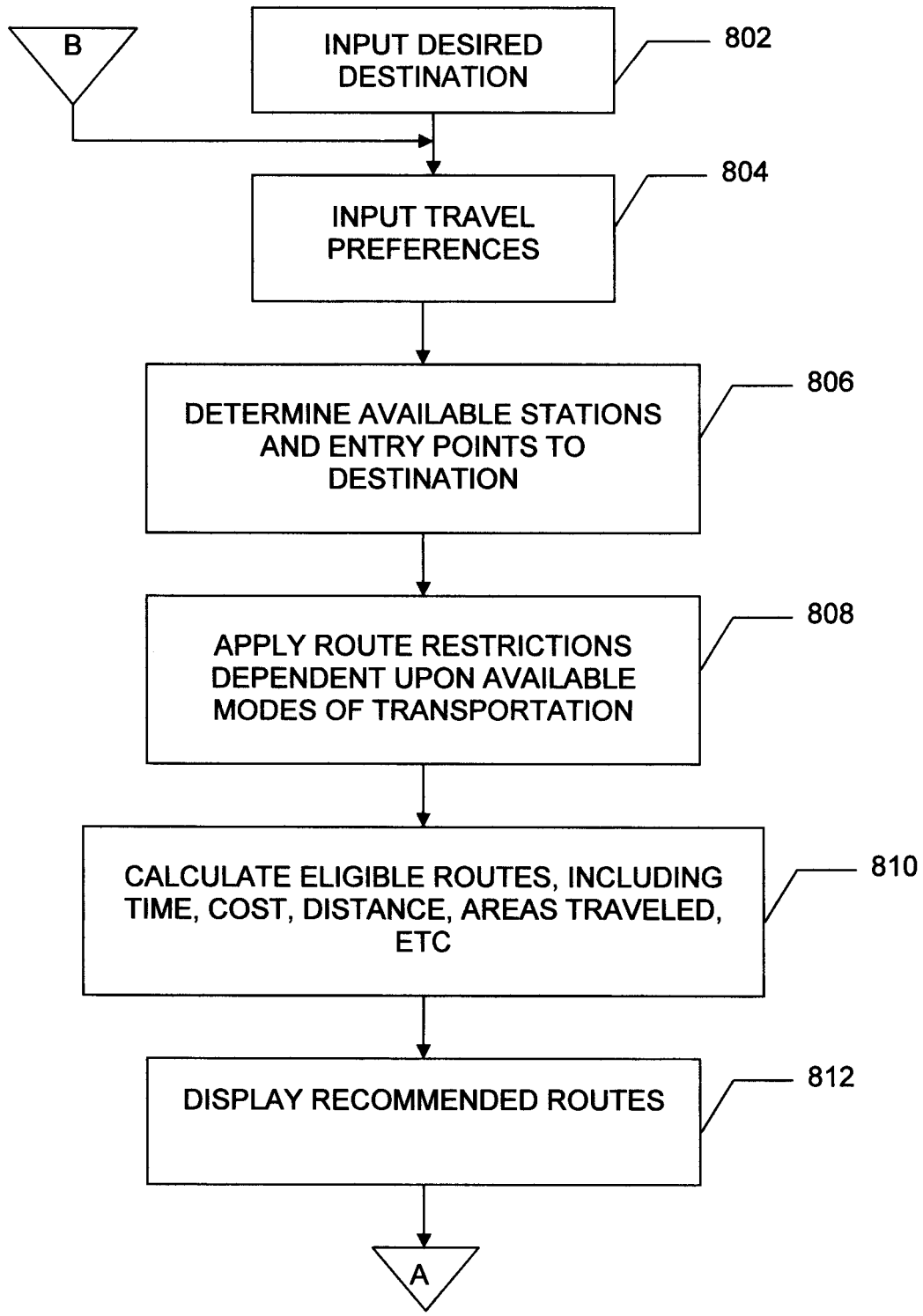
FIG. 8A-8B are a flow diagrams of the present invention take into account the availability of public and/or private transportation modes.
Figure 8B:
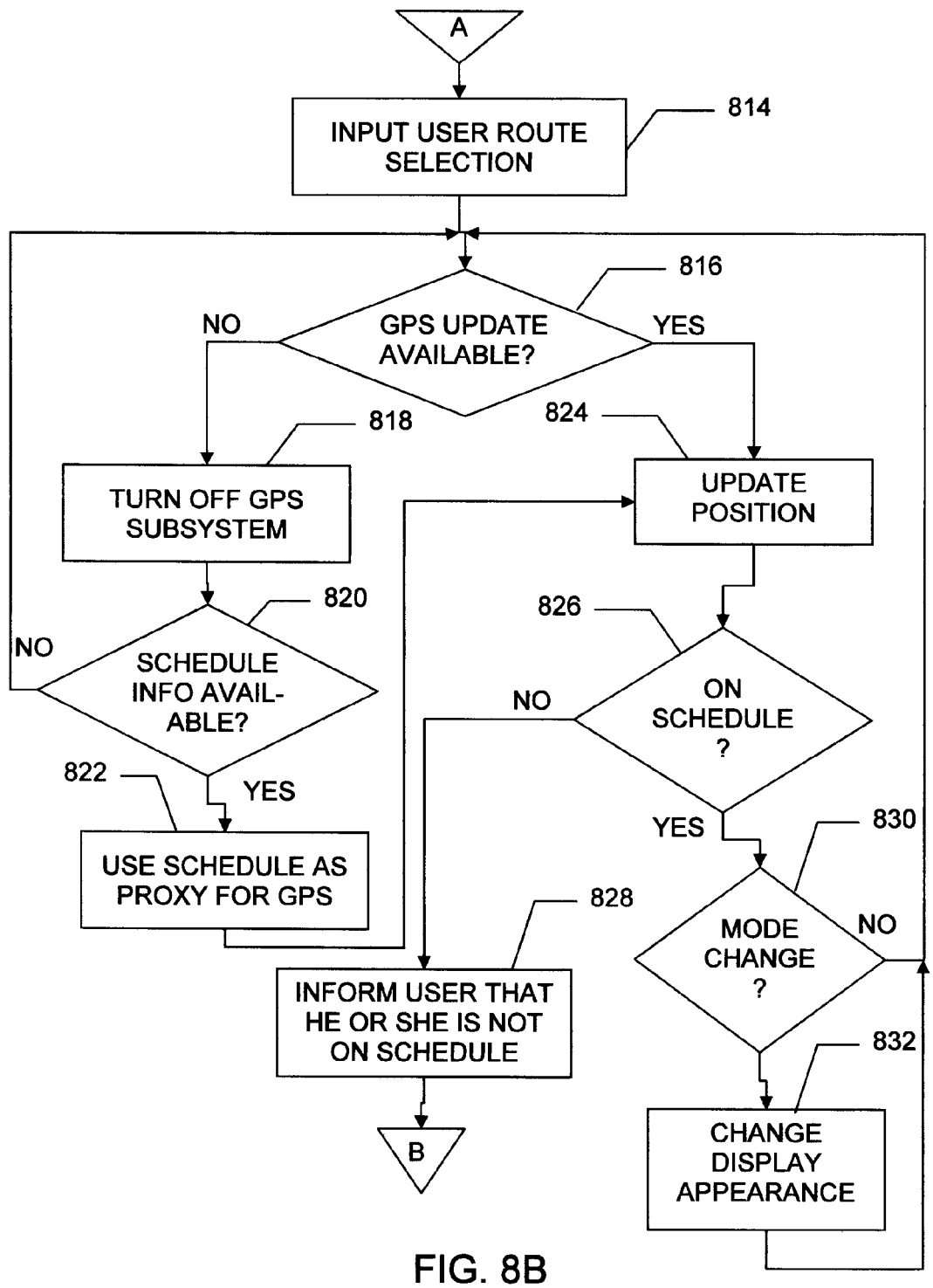

In some configurations of the present invention and referring to the flow chart of FIG. 8, a user is prompted for a desired destination. This destination can be input at block 802, for example, using display screen 326 and stylus 330 and/or input keys 328. In some configurations, the user is also prompted to input, at block 804, optional travel preferences. Examples of optional travel preferences can include preferences for walking (if, for example, the user wants exercise), for taking/avoiding a bus (if, for example, the user has a bus pass), or for taking/avoiding the ferry (if the user has a ferry pass or a fear of the ferry). Other examples of optional travel preferences can include selection of a specific fixed travel or arrival time and/or a preference to pass by specific sites or take a scenic route. For example, the user may want to spend two hours sightseeing before needing to be at an airport, to take a ferry to get between two points, or to take the lowest cost route, accounting for tolls, bus fare, train fare, an already acquired bus pass, etc.

Using the current position (or another starting position that may have been selected and input by the user), the destination that was input at block 802, and any optional user preference, the device 230,310,516 and or the server 502 then determines available stations and entry/exit points to the destination at block 806. For example, subway stations represent entry points for subways, and train stations represent entry points for train stations. From this information, likely route segments are chosen. For example, schedules, routes, and fees for various modes of transportation (e.g., bus, train, ferry, airline, subway, or other modes of transportation, public and private), estimated walking and biking speeds are stored in memory 442. In some configurations, this information may be updated by inserting a new cartridge 433, via I/O port 454, or via cellular transceiver 458 or another radio link, such as Bluetooth or 802.11 g. Thus, for subway and train travel, route segments are limited to travel between entry points, at predetermined schedules. Also, as can be appreciated, subway and train segments follow subway and train tracks rather than roads. Segments that do not advance a user towards the desired destination or deposit a user near an entry point for another mode of transportation that does advance the user can be excluded in some route calculations but may be included in some others subject to user preferences, e.g., in scenic route calculations. Thus, for example, if the user has requested a scenic route, a specific mode of transportation, and/or a specific arrival or travel time, the route may meander and be purposefully inefficient in terms of speed, time, and/or other factors.

At block 808, route restrictions are applied dependent upon the available modes of transportation. For example, a one-way street limitation may be applied if a user is traveling a segment via car or cab, but not if the user is traveling that segment by foot or bicycle.

At block 810, the determined route segments and route restrictions are used to calculate a selection of routes, which may be subject to the set of user preferences, if any. Each route may comprise an integrated set of transportation modes. For example, transportation modes included in a route may include, car, cab, airline, private plane (if enabled), train, bus, ferry, walking, biking, etc. A segment in a route may use any one of these or other transportation modes. Route segments may be calculated using methods described above, except that certain segments may have fixed starting and ending times or travel times according to the schedule for the appropriate mode of transportation. Total times, distances, and/or costs of each route may be calculated and evaluated according to the user preferences that are input at block 804. In comparing routes to user preferences, various factors may be taken into consideration depending upon available information about the various route segments. For example, the information may indicate that it is faster to walk a little further to and/or wait at a bus stop rather than take a train at a station that may only be a few steps away.

At block 812, the navigational aid device displays routes that meet user preferences, if any, and may also display total times, distances, and/or costs. The user selects one of the displayed routes at block 814. If none of the displayed routes is acceptable, the user can be provided with the option to start over at block 802 or 804, although this option is not shown in the flow chart of FIG. 8.

At block 816, a check is performed to determine whether GPS signals are available for a position update. If not, or (in some configurations) if the segment of the current route uses a transportation mode for which it is known that GPS signals are not available (for example, a subway), the GPS subsystem may be turned off for a time to save power. For example, GPS receiver 438 in the configuration of FIG. 4 is turned off at block 818. However, if schedule information for the current mode of transportation is known at block 820, this schedule information may be used as a proxy for a GPS update at block 822. For example, from schedule information, it may be determined by processor 436 that a user should be 80% of the distance along a subway segment of the selected route. In that case, at block 824, the map display on the device is updated in some configurations by processor 436 to show the estimated location along the subway route segment and/or route. If GPS signals are available at block 816, the position is also updated at block 824.

A check is the performed at block 826 to determine whether the user is on the schedule set by the route. For example, the GPS-determined location can be used to check whether a bus that the user is on is running ahead or behind schedule. If the user is behind schedule, the user is informed on a display of the navigational aid device at block 828 and given the opportunity to select a new route according to the user's travel preferences at block 804. However, in some configurations (not shown in FIG. 8), the navigational aid device may automatically monitor conditions along the route and update the route as travel conditions change. For example, if the user is near the bus stop originally calculated for a route, but another nearby bus stop is now better according to the user's criteria, the display of the navigational aid device may alert the user of this fact and suggest that the user take the bus at the alternate stop, instead.

In some configurations of the present invention, a check is performed at block 830 to determine whether a transportation mode change has occurred. This determination may be made directly from the present location on the route (i.e., whether the user is at a location where a new route segment with a different mode of transportation is to be taken), or made be made using other indications, such as speed and direction of travel, proximity to roads or other types of paths, etc. This change in transportation mode may affect route calculation and other device behavior, such as the display of different data fields.

For example, if a user is in pedestrian mode, but then gets into a car and starts driving, the device may detect a speed or a speed change over a selected limit. For example, the speed may increase to greater than 15 mph or perhaps 30 mph. Depending upon the selected limit, the device may automatically change to driving mode, or prompt the user for confirmation that a change may have occurred and to set the correct transportation mode. More broadly, the detection of mode change can be based on one or more criteria, such as, proximity to a transit or train station, the mounting of the device in a special mount or docking station. For example, the device changes to driving mode when the device is in a car mount, or to pedestrian mode, when removed; the device changes to bicycle mode when mounted in a bicycle mount; or when in a docketing station connected to a PC, it changes to indoor mode. The detection of whether a device is in a mount can be made with and/or independent of the detection of an external power source. This makes such mode determination more reliable, since users sometimes, for example, may remove the power cord in the car and use the device without external power. Detection of mounting in a particular mounting apparatus can be done either mechanically (e.g., a switch) and/or via a built-in resistor or integrated circuit, the presence and/or value of which can be detected by the device when in the mount.

A mode change might also be triggered by a tilt sensor or other sensor that senses the orientation of the device. For example, users tend to hold a unit in portrait orientation when walking, whereas a unit may be mounted in landscape orientation in an automobile mount. Thus, portrait orientation can be used to trigger (or request confirmation of) pedestrian mode, whereas landscape orientation can be used to trigger (or request confirmation of) automobile mode.

Furthermore, the tilt sensor may be used to automatically adjust an orientation of the display. For example, when the pedestrian mode is triggered, such as the user holding the device in portrait orientation, the display may be automatically adjusted to portrait orientation. Alternatively, when the automobile mode is triggered, such as upon detection of landscape orientation, the display may be automatically adjusted to landscape orientation. In this manner, the device may automatically adjust the display's orientation to match its orientation, thereby ensuring the display is easy to interpret regardless of the device's orientation.

If no change in transportation mode has occurred or been detected or verified, another check is made at block 816 to determine whether another GPS position update is available. Otherwise, if a change has occurred, some configurations of the present invention change the appearance of the display (e.g., display 426 in the configuration of FIG. 4). For example, the display may use different colors to indicate different modes of transportation, or an icon representing the current mode of transportation may be shown on the screen (e.g., the map screen, which is likely to be the most frequently used). By way of example only and not by way of limitation, these icons may be the location icon on the map, and may be a vehicle icon in the case of automobile mode, a person in the case of pedestrian mode, and a bicycle in the case of bicycle mode.

Display appearance changes may also be made in some configurations to indicate whether location data is real-time or schedule-based. For example, display colors may change dependent upon whether GPS updates are available or whether they are interpolated using the schedule as a proxy for GPS position updates. Also, some configurations of the present invention provide previews of upcoming travel segments. For example, along with the schedule information, other useful information may be stored and displayed at an appropriate time or upon user command, such as the amount of bus fare needed, whether exact change is needed upon boarding, the number of the bus, and/or the gate from which the bus/train/ferry/plane leaves and any physical markers that may be useful in finding the bus (e.g., follow a yellow line). In addition, other useful information that may be calculated and displayed may include, but not be limited to how long the user will have to wait for a bus/train/ferry/plane, whether a newsstand or coffee is nearby, whether the user has time to go to the bathroom or the news stand or coffee shop, etc., and how far in advance to warn a user prior to a departure to ensure that a wandering user makes in onboard. Some configurations of the present invention can also provide a display of the location of all other nearby stations and entry points, or just the station or entry point of the next route segment, and the selection of which to display may be input by the user.

The display can include real-time data, as received from the vehicles operating on the various segments, or can be based on schedule data. The display appearance may be changed accordingly, such as by indicating by color whether schedule data or real-time data is being used. Real time data may be obtained in the configuration of FIG. 4, for example, via I/O port 454 or cellular transceiver 458, or, in the configuration of FIG. 5, via communications channel 518. For example, many modes of public transportation are tracked in real or near real time. Where such information is available the device of the present invention may use is as a proxy for GPS derived positioning data. Specifically, the device may loose GPS signals upon entering a subway station or an airplane and may therefore no longer be able to directly track the user's progress. In such a situation, the device may rely on the schedule information and/or tracking information from other sources, such as the subway system or an air traffic control system that tracks the appropriate mode of transportation.

The above systems, devices and methods have been described, by way of example and not by way of limitation, with respect to improving accuracy, processor speed and ease of user interaction with a navigation device. That is, the systems, devices and methods provide for a navigational route planning device which is more efficient and accurate than current low cost systems, without requiring more expensive system resources. The systems, devices and methods of the present invention offer an improved navigational route planning device that provides more understandable, accurate, timely, and useful route calculation capabilities. Moreover, it will be appreciated that various configurations of the present invention provide the ability to take the availability of various different forms of transportation into account in determining and/or updating a route.

Specifically, while prior art navigation systems and devices assumed one mode of transportation, the present invention is not so limited. For example, the present invention may analyze multiple modes of transportation, including private and public transportation, and choose among them according to the user preferences and specifications. Moreover, the present invention can calculate a route that relies on multiple modes of transportation. For example, the user may stand on his or her front porch in New York City and request a route to Bainbridge Island near Seattle. The present invention, itself, may generate a route that includes route segments: 1) walking to a subway station; 2) riding the subway to a train station; 3) riding the train to an airport; 4) flying in a commercial airliner to Seattle; 5) taking a cab to a bus station; 6) riding the bus to a stop closest to a Ferry station; 7) walking to the Ferry station; and 8) riding the Ferry to Bainbridge Island, or any other combination of route segments. The present invention may provide directions, instructions, and the other information, as discussed above, with regard to each and every route segment.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

While the invention has been described in terms of various specific embodiments, those skilled in the art will recognize that the invention can be practiced with modification within the spirit and scope of the claims.

What is claimed is:

1. A navigation device comprising:
   a display;
   a user interface operable to receive a travel preferences input from a user, the travel preferences input indicating user preferences for driving, walking, and mass-transit;
   a memory including cartographic data corresponding to a plurality of transit thoroughfares, the cartographic data including mass-transit fee information and mass-transit route segments;
   a location determining component operable to determine a current geographic location of the navigation device; and
   a processor coupled with the location determining component, the memory, and the display, the processor operable to:
      calculate a route to a destination based on the travel preferences input, the mass-transit route segments, and the cost for traveling on one or more mass-transit route segments, the calculated route including one or more mass-transit route segments, and
      control the display to present a visual indication of progress along the calculated route based on the current geographic location of the navigation device determined by the location determining component.

2. The device of claim 1, wherein the cartographic data includes road data and mass-transit track data.

3. The device of claim 1, wherein the calculated route includes driving and walking route segments.

4. The device of claim 1, wherein the travel preferences input includes preferences for one or more modes of transportation.

5. The device of claim 1, wherein the mass transit route segments correspond to travel between entry points associated with a mode of transportation.

6. The device of claim 5, wherein the entry points associated with subway route segments are subway stations.

7. The device of claim 1, wherein the processor is further operable to:
   generate navigation instructions based on the calculated route and the current geographic location of the navigation device; and
   control the display to present a visual indication of the generated navigation instructions.

8. The device of claim 1, wherein the display is a touch-screen display and the user interface comprises at least a portion of the display.

9. The device of claim 1, wherein the mass-transit fee information includes bus fare and train fare.

10. The device of claim 1, wherein the cartographic data includes mass-transit schedule information and the route is calculated based on the mass-transit schedule information.

11. The device of claim 1, wherein the mass-transit route segments include subway route segments.

12. The device of claim 1, wherein the mass-transit route segments include bus route segments.

13. The device of claim 1, wherein the processor is further operable to determine the lowest cost route to a destination.

14. The device of claim 1, wherein the location determining component includes a global positioning system (GPS) receiver.

15. A navigation device comprising:
a display;
a user interface operable to receive a travel preferences input from a user, the travel preferences input indicating user preferences for driving, walking, and mass-transit;
a memory including cartographic data corresponding to road data, mass-transit schedule information, mass-transit fee information and mass-transit route segments;
a location determining component operable to determine a current geographic location of the navigation device; and
a processor coupled with the location determining component, the memory, and the display, the processor operable to:
calculate a route to a destination based on the travel preferences input, the mass-transit schedule information, the mass-transit route segments, and the cost for one or more mass-transit route segments, the calculated route including at least two or more driving, walking, and mass-transit route segments,
generate navigation instructions based on the calculated route and the current geographic location of the navigation device,
control the display to present the lowest cost route to a destination and a visual indication of progress along the calculated route based on the current geographic location of the navigation device determined by the location determining component, and
control the display to present a visual indication of the generated navigation instructions.

16. The device of claim 15, wherein the display is a touch-screen display and the user interface comprises at least a portion of the display.

17. The device of claim 15, wherein the mass-transit fee information includes bus fare and train fare.

18. The device of claim 15, wherein the location determining component includes a global positioning system (GPS) receiver.

19. The device of claim 15, wherein the mass-transit route segments include subway route segments.

20. The device of claim 15, wherein the mass-transit route segments include bus route segments.

21. The device of claim 15, wherein the processor is further operable to control the display to present the amount of fare needed.

22. The device of claim 15, wherein the processor is further operable to control the display to present a number associated with the mass-transit vehicle and a location from which the mass-transit vehicle departs.

* * * * *